United States Patent [19]
Evans et al.

[11] 3,780,991
[45] Dec. 25, 1973

[54] PROPORTIONING HOPPER FOR GRANULAR MATERIALS

[75] Inventors: Arthur J. Evans, Northville, Mich.; Joseph C. Morin, New Westminister, British Columbia, Canada

[73] Assignee: Whitlock, Inc., Farmington, Mich.

[22] Filed: Aug. 17, 1972

[21] Appl. No.: 281,530

[52] U.S. Cl. ............................................. 259/18
[51] Int. Cl. ......................... B01f 5/00, B01f 15/04
[58] Field of Search ................... 222/144.5; 259/4, 259/18, 36, 180; 141/248, 100

[56] References Cited
UNITED STATES PATENTS 298,904  5/1884  Sheppard ........................... 259/180
3,020,234  2/1962  Haumann ............................... 259/4

Primary Examiner—William I. Price
Attorney—James B. Kinzer et al.

[57] ABSTRACT

A proportioning hopper for granular plastics and like materials, having two aligned inlet ports on opposite sides of the hopper, with two conical closure members of moderately soft elastomer material each engaging one port in a line contact seal to close the port. A double-acting pneumatic or hydraulic cylinder retracts the closure members to admit material to the hopper; a biasing spring in the cylinder normally maintains both ports closed. The two closure members cannot be held open simultaneously. A timing and sequence control actuates the cylinder to open the ports alternately in timed sequence to mix two different materials in the hopper in predetermined proportions.

7 Claims, 4 Drawing Figures

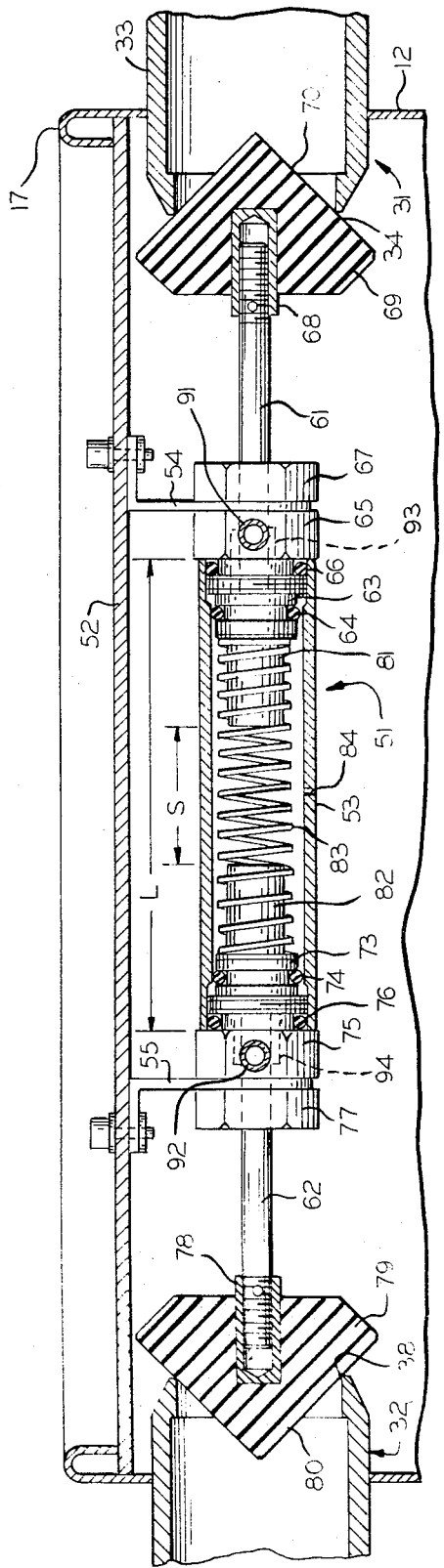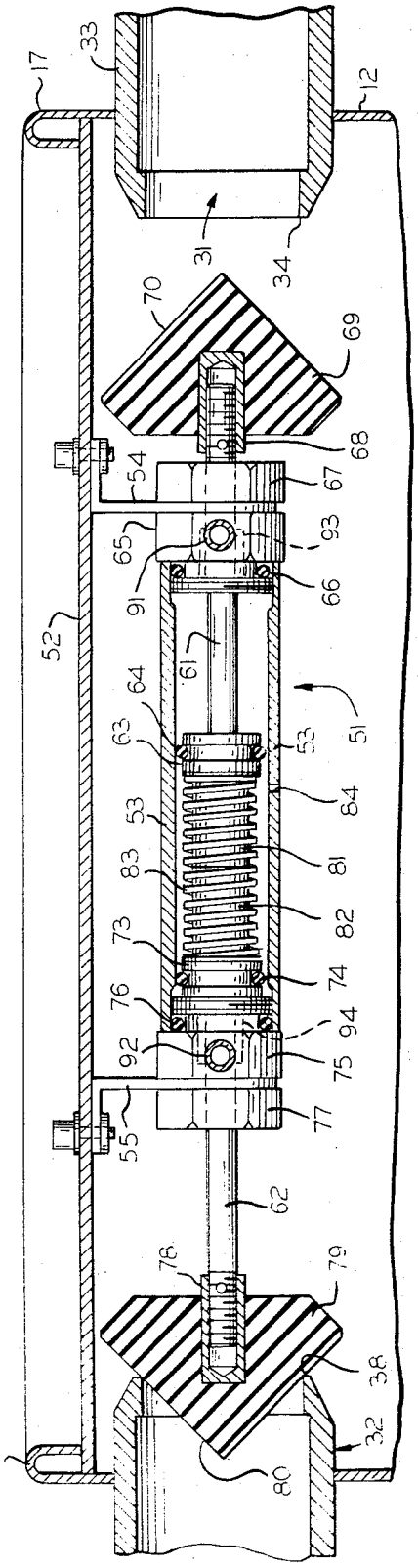

3,780,991

PROPORTIONING HOPPER FOR GRANULAR MATERIALS

BACKGROUND OF THE INVENTION

There are a number of industrial and agricultural applications in which vacuum conveying systems are utilized to feed granular or powder material from storage to some form of processing or packaging equipment. In many of these applications, it is necessary to mix two or more such materials as the materials are supplied to the processing apparatus. For example, in the molding of various industrial and commercial articles from resinous materials, it may be necessary to mix two different plastics to form a composite plastic material of given characteristics. Precision control of proportions and thorough mixing are often required. On the other hand, pre-mixing of substantial quantities may not be desirable because other pressures or processing equipment may be in operation and may be fed from the same basic material supplies at the same time, with different proportions required or even with different materials entailed.

In applications like those discussed above, the mixing of the granular materials is often accomplished in a storage hopper from which the material mixture is fed directly to the processing equipment. Thus, a vacuum conveyor system may be set up to feed two different materials to a storage hopper, with the feeding of the materials controlled on a time basis to obtain the requisite proportions. The flow of materials into the hopper is conventionally controlled by individual valves interposed in the vacuum feed lines; a coordinated control system actuates the valves in timed sequence.

The valves utilized in these systems have presented a number of continuing and difficult technical problems. The granular material being fed into the mixing and storage hoppers tends to clog the valves, so that frequent cleaning may be required. Accumulation of granular or powdered material in the valves may lead to premature value failure. If one of the valves fails in an open condition, a reverse flow of material may occur when pressure is restored to the hopper incident to feeding material from the hopper to the process equipment. This may lead to contamination of one of the basic sources for the materials being mixed, due to reverse transfer of the other material to that supply. Moreover, the valve installations for equipment of this kind are relatively expensive, in part due to the necessity for installing a complete operative valve and actuating mechanism in each of the conveyor lines that feeds the mixing and storage hopper.

SUMMARY OF THE INVENTION

Accordingly, the present invention is directed to a new and improved mixing and storage device for mixing two distinct granular or powdered materials, in predetermined proportions, and for storing the mixed materials, which inherently eliminates or minimizes the aforementioned difficulties encountered in prior art systems.

A particular object of the invention is to provide a new and improved mixing and storage device for granular and powdered materials, such as granular plastics, in which the entire valve mechanism for controlling the admission of the granular materials to a storage hopper is mounted entirely within the hopper itself. A related object of the invention is to provide a dual valve mechanism for a mixing and storage device for mixing two distinct granular or powder materials that is capable of long, service-free life despite that fact that the valve mechanism is entirely enclosed within a storage hopper and is regularly subjected to a flow of granular or plastic material, at relatively high velocities, around and over the valve mechanism.

Another object of the invention is to provide a new and improved mixing and storage device, including a storage hopper with an internally mounted valve mechanism for controlling the admission of granular or powder materials from two separate inlet ports that is essentially failsafe in operation and cannot maintain both inlet ports open at the same time.

A particular object of the invention is to provide a new and improved mixing and storage device for mixing two distinct granular or powder materials, in precisely predetermined proportions, that is relatively inexpensive to manufacture, that is capable of effective operation with conventional vacuum conveyor systems, and that requires a minimum of maintenance.

Accordingly, the invention relates to a mixing and storage device for mixing two distinct powder or granular materials, such as granular plastic materials, in predetermined proportions, and for storing the mixed materials. The mixing and storage device comprises a hopper having two opposed material inlet ports located in the upper portion of the hopper and coaxially aligned with each other. Two valve plungers are incorporated in the device; each plunger includes a closure member and is axially movable between a closed position in which the closure member closes a respective one of the material inlet ports and an open position in which the closure member is displaced from its associated material inlet port. Biasing means are provided for normally maintaining both of the valve plungers in their closed positions. Fluid pressure actuated cylinder means are mounted in the upper portion of the hopper, for moving the valve plungers between their respective open and closed positions. Control means are provided for actuating the cylinder means to move the valve plungers in alternation to open and close the material inlet ports alternately in accordance with a predetermined time cycle and thereby introduce two distinct materials into the hopper in predetermined quantities.

BRIEF DESCRIPTION OF THE DRAWINGS

FIG. 3 is a detail sectional view of the valve mechanism for the device of FIG. 1, showing the two inlet ports to the device closed; and FIG. 4 is a sectional view like FIG. 3 but showing one of the inlet ports open.

DESCRIPTION OF THE PREFERRED EMBODIMENT

Figure 1:
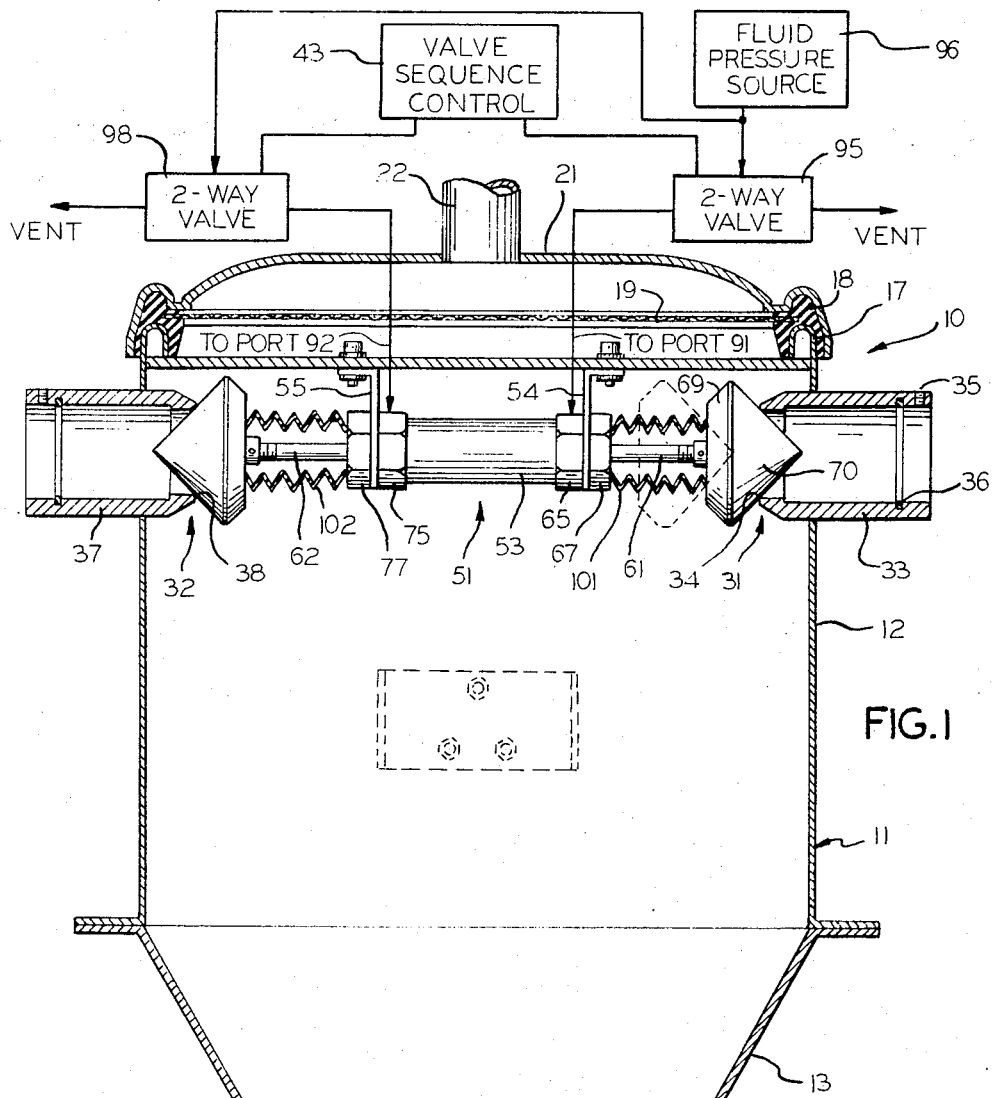
FIG. 1 is an elevation view, partly in cross-section and partly schematic, of a mixing and storage device, constructed in accordance with one embodiment of the invention.
Figure 2:
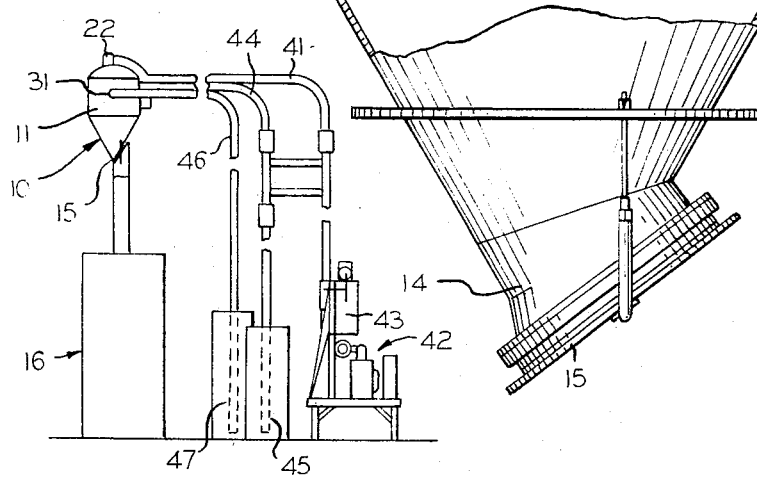
FIG. 2 illustrates the manner in which the mixing and storage device of the invention may be incorporated in a vacuum conveyor system for feeding a plastic molding press or other process equipment.

FIG. 1 illustrates a mixing and storage device 10 constructed in accordance with one embodiment of the invention. In FIG. 2, device 10 is shown incorporated in a vacuum conveyor system for feeding granular or powdered plastic material to a molding press or other processing equipment. As shown in FIG. 1, the mixing and storage device 10 comprises a hopper 11 having a cylindrical upper section 12 mounted upon a conical lower section 13. The conical section 13 of hopper 11 terminates, at its lower end, in an outlet section 14 provided with a gate or closure member 15 through which granular material stored in hopper 11 can be fed to a molding press or other processing equipment 16 (FIG. 2).

The upper rim of hopper section 12 is rolled over to afford a gasket seat 17 extending completely around the top of the hopper. A gasket 18 is mounted upon the gasket seat 17. Gasket 18 is preferably formed of molded elastomer material which fits closely around the gasket seat 17. A filter 19 is mounted in gasket 18 and extends across the entire upper portion of hopper 11.

A cover 21 closes off the top of hopper 11. Cover 21 fits closely over gasket 18 to seal the upper portion of the hopper. A pressure mounting for cover 21, not shown in the drawings, is utilized to assure an effective seal for the hopper. Conventional clamp mechanisms, which are well known in the art, can be utilized for this purpose. A vacuum and pressure line connection 22 to the interior of hopper 11 is provided in cover 21.

There are two inlet ports 31 and 32 located in the upper portion of hopper 11. Inlet port 31 comprises a conveyor conduit connector 33 that extends through the upper wall of hopper section 12, terminating within the hopper in a relatively sharp rim constituting a valve seat 34. The rim of valve seat 34 should have a radius of less than 1/16 inch; a radius of 1/32 inch or even less is preferred. The outer portion of connector 33, which projects outwardly of hopper section 12, may include one or more set screws 35 and an O-ring seal 36 to afford a substantially air-tight connection to a conveyor conduit inserted into the connector. Any other form of connector construction suitable for effecting a substantially air-tight seal to a conveyor conduit may be utilized as desired.

The construction for inlet port 32 is similar to that for port 31. Thus, port 32 comprises a conduit connector 37 having a relatively sharp rim affording an internal valve seat 38. Connector 37 projects outwardly of the upper hopper section 12 and includes appropriate means for effecting an air-tight connection to a material conveyor conduit. The two inlet ports 31 and 32 are coaxially aligned with each other, preferably on a diameter of storage hopper 11.

In a conveyor system, as illustrated in FIG. 2, the vacuum and pressure port 22 of device 10 is connected to an air line 41 that is in turn connected to a power unit 42. Power unit 42 may be of conventional construction and includes a vacuum pump and compressor with appropriate valve connections to conduit 41 to enable the power unit to pump air out of mixing and storage device 10 through line 41 or to supply air under moderate pressure to the upper portion of the hopper 11 through same line 41. Power unit 42 further comprises a valve sequence control mechanism 43 for controlling the operation of power unit 42 and the mixing and storage device 10, as described more fully hereinafter.

In the system shown in FIG. 2, inlet port 31 of device 10 is connected to a conveyor conduit 44 that extends into a first material supply bin 45. The other inlet port 32 of device 10 (FIG. 1) is connected to a material conveyor line 46 (FIG. 2) that extends into a second material storage bin 47. In each instance, the material conveyor conduit projects into the bottom portion of its storage bin to allow for effective extraction of material from the storage bin despite fluctuations in the level of the material supply.

Mixing and storage device 10, as shown in FIG. 1, further comprises a valve mechanism 51, mounted in the upper section 12 of hopper 11, for controlling the flow of materials into hopper 11 through inlet ports 31 and 32. Valve mechanism 51 is shown in even greater detail in FIGS. 3 and 4. The valve mechanism includes a support bar 52 which extends across the top of hopper section 12, immediately below the gasket seal rim 17. A cylinder 53 is supported by bar 52, being mounted on the support bar by means of two brackets 54 and 55.

Two valve plungers 61 and 62 are incorporated in valve mechanism 51. Valve plunger 61 extends into one end of cylinder 53 and is connected to a piston 63 mounted within the cylinder. Piston 3 carries an O-ring 64 that affords a seal between the piston and the internal wall of cylinder 53. A cylinder end member 65 is mounted in the end of cylinder 53 in which piston 63 is located. Member 65 is threaded into the end of the cylinder and is sealed into the cylinder by appropriate means such as an O-ring 66. Bracket 54 is mounted on the end member 65 by means of a jam nut 67 through which valve plunger 64 extends.

The outer end of valve plunger 61 carries the core 68 of a valve closure member 69. Core 68 is formed of metal and is threaded onto the end of valve plunger 61. The main body of valve closure member 69 is molded of moderately soft elastomer material. Closure member 69 should be of a material in a range of 40 to 80 durometer. Closure member 69 may be formed of Neoprene, synthetic rubber, or any other elastomer that is relatively inert with respect to the materials stored in hopper 11.

Valve plunger 62 is similar in construction to valve plunger 61. Thus, plunger 62 is connected to a piston 73 mounted in the end of cylinder 51 facing inlet port 52. Piston 73 is sealed to the external wall of cylinder 53 by suitable means such as an O-ring 74. Plunger 62 projects through a cylinder end member 75 that is threaded into the cylinder and provided with an external seal comprising an O-ring 76. A jam nut 77 secures this end of the cylinder to bracket 55. The outer end of valve plunger 62 carries a valve closure member comprising a core 78 threaded onto the end of plunger 62 and a closure element 79 molded of a moderately soft elastomer material in a range of 40 to 80 durometer.

Each of the closure members 69 and 79 is of tapered configuration, affording a conical surface that engages the relatively sharp valve seat of the associated inlet port. Thus, when the valves are closed as shown in FIG. 3, the conical surface 70 of closure member 69 engages valve seat 34 of inlet port 31 in a continuous line-contact seal. Simiarly, the conical closure surface 80 of valve closure member 79 engages the relatively sharp internal valve seat 38 of inlet port 32 in a continuous line-contact seal.

Within cylinder 53, piston 63 includes a spring retainer and stop member 81 that projects axially inwardly of the cylinder toward the other piston 73. Piston 73 provided with a similar axially projecting spring retainer and stop member 82 that extends toward member 81. A helical spring 83 is mounted upon the two members 81 and 82, extending the full length of cylinder 53 between pistons 63 and 73 and biasing both of the pistons outwardly of the cylinder toward their valve-closed positions as illustrated in FIG. 3. Cylinder 53 includes a small pressure relief aperture 84; aperture 84 may be connected to a small conduit to vent the interior of cylinder 53 outside of hopper 11 if desired.

Cylinder 53 is provided with two pressure inlet ports 91 and 92. As shown in FIGS. 3 and 4, port 91 is formed in the cylinder end member 65 and communicates, by an internal passage 93, with the outer face of cylinder 63. Similarly, port 92 is located in the cylinder end member 75 and communicates with an internal passage 94 that leads to the outer face of piston 73. As shown in FIG. 1, port 91 is connected to a two-way control valve 95. Valve 95 has an inlet connection to a fluid pressure source 96. Source 96 may be a compressed air supply and may constitute a part of power unit 42 (FIG. 2). Source 96 is also connected to a second two-way valve 98 that is connected to the port 92 at the other end of cylinder 53. Valves 95 and 98 are connected to the valve sequence control 43 that actuates power unit 42 (FIGS. 1 and 2). Valves 95 and 98 are shown as separate components for simplicity in explanation of operation; however, it will be recognized that these two valves may comprise a single valve structure of more comprex construction, since they are operated in co-ordinated alternation as described more fully hereinafter.

Each of the two valve plungers 61 and 62 may be provided with a protective sleeve or boot to minimize penetration of powdered or granular material into valve mechanism 51. Thus, valve plunger 61 may be equipped with a protective boot 101 and valve plunger 62 may be provided with a protective boot 102 as shown in FIG. 1. Boots 101 and 102 are not essential to operation of valve mechanism 51 but may be desirable, particularly in those instances in which the granular or powdered material being mixed and stored in device 10 is relatively abrasive or corrosive and hence presents a particularly severed wear possibility with respect to the valve plungers and piston.

At the outset, in considering the operation of the vacuum conveyor system (FIG. 2) and device 10 (FIGS. 1-4), it may be assumed that hopper 11 of device 10 contains a substantial quantity of properly mixed granular or powdered materials suitable for feeding to the molding press or other process equipment 16. As long as this condition is maintained, hopper 11 is held at a pressure equal to or slightly above atmospheric pressure. Whenever the process equipment 16 requires an additional supply of granular material, gate 15 is opened to supply additional material to the process apparatus 16.

Hopper 11 is preferably equipped with a sensor for detecting the instantaneous level of the granular or powder material stored in the hopper. The sensing device is not illustrated in the drawings because it may be completely conventional. With continuing material withdrawals, the sensor ultimately signals sequence control 43 to indicate that the supply of material in hopper 11 is no longer adequate. Under these circumstances, control 43 actuates a control valve in conduit 41 to connect conduit 41 to the vacuum pump in power unit 42. The vacuum pump pumps the air out of hopper 11, through conduit 41 and port 22, developing a substantial vacuum in hopper 11. Filter 19 prevents any substantial withdrawal of granular or powder material from the hopper during intervals in which the vacuum pump maintains the requisite vacuum in the hopper.

After the upper portion of hopper 11 has been evacuated, sequence control 43 actuates the first two-way valve 95 to connect compressed air supply or other fluid pressure source 96, (FIG. 1), which may be a part of power unit 42 (FIG. 2), to the port 91 in the right-hand end of cylinder 53 (FIGS. 1, 3 and 4). As a consequence, compressed air is introduced into cylinder 53 at the outer face of piston 63. Accordingly, piston 63 is driven inwardly of cylinder 53, against the bias afforded by spring 83, moving piston 63 from the position shown in FIG. 3 to that illustrated in FIG. 4. The movement of piston 63 effects a corresponding movement of valve plunger 61 and withdraws valve closure member 69 from its engagement with the valve seat 34 of inlet port 31. Thus, plunger 61 is moved from its normally closed position (FIG. 3) to its open position (FIG. 4). The movement of piston 63 is stopped when its stop member 81 engages the stop member 82 on piston 73.

The displacement of closure member 69 from the position of FIG. 3 to that of FIG. 4 opens port 31, as shown in FIG. 4. The vacuum previously developed in the upper portion 12 of hopper 11 now causes granular material to be drawn from the first supply bin 45 (FIG. 2) into the upper portion of hopper 11.

After a relatively brief time interval, allowing a predetermined quantity of granular material to be drawn into hopper 11 from bin 45, the valve sequence control 43 actuates the first valve 95 back to its original operating condition, disconnecting valve 95 from port 91 of cylinder 53 and venting port 91 to the atmosphere (FIG. 1). At the same time, control 43 actuates valve 98 to connect the fluid pressure source 96 to the other pressure inlet port 92 of cylinder 53. The actuation of valve 98 causes a flow of air under pressure through port 92 and into cylinder 53 against the outer face of piston 73. This drives piston 73 to the right. At the same time, because port 91 is now connected to the atmosphere, piston 63 is free to move axially of cylinder 53 back toward its original position. Accordingly, the two pistons 73 and 63 move conjointly to the right, from the position shown in FIG. 4, bringing valve closure member 69 back into engagement with valve seat 34 and closing inlet port 31. At the same time, valve closure member 79 is moved away from valve seat 38, opening the second inlet port 32. That is, the closure member 79 of the second valve plunger 62 is displaced to a position free of valve seat 38, allowing unimpeded access of material from inlet port 32 into the upper interior portion of hopper 11.

Inlet port 32 is held open for a limited period of time determined by sequence control 43. During this short time interval, the vacuum previously developed in the upper portion of hopper 11 causes material to be drawn through conduit 46 and inlet port 32 (FIGS. 1 and 2) into the upper section 12 of storage hopper 11.

After inlet port 32 has been held open for a short time interval, determined by the setting of sequence control 43, control 43 again actuates valves 95 and 98. Valve 98 is now actuated to vent cylinder port 92 to the atmosphere and pressure source 96 is connected to port 91. The cmpressed air supplied to cylinder 53 through port 91 drives piston 63 back to the left from the position illustrated in FIG. 3 toward that illustrated in FIG. 4. At the same time, since port 92 is vented to the atmosphere, piston 73 is free to move back to its original position, in which plunger 62 and closure member 79 close the inlet port 32. In the manner, port 31 is opened and port 32 is again closed. This operation is repeated several times so that short "bursts" of granular or powder material are fed into hopper 11 of device 10, in alternation, to fill the hopper. The opening and closing of the two inlet ports 31 and 32 is carried out alternately in accordance with a predetermined time cycle to introduce two distinct materials into the hopper, in predetermined proportions. The materials spray across the upper surface of hopper 11 in a widespread pattern; by maintaining each port open for only a relatively short interval, thorough mixing of the two granular or powder materials is effected and "layering" is minimized.

The filling of hopper 11 of mixing and storage device 10 may be effected in accordance with a fixed time cycle or may be carried out continuously until a sensor associated with hopper 11 indicates that an adequate supply of mixed granular material is present in the hopper. With either type of control, sequence control 43 ultimately interrupts the feeding of material to hopper 11 by actuating both of the valves 95 and 98 to vent the cylinder ports 91 and 92 to the atmosphere. As a consequence, the two valve plungers 61 and 62 are returned to their closed positions, illustrated in FIGS. 1 and 3, by the biasing spring 83. This closes both of the inlet ports 31 and 32 and terminates the conveying of granular material into the hopper. Control 43 may then actuate power unit 42 to supply compressed air to the upper portion of hopper 11, through conduit 41 and port 22, to afford a "backwash" operation for filter 19. In some systems, it may be desirable to maintain a limited positive pressure within hopper 11 during subsequent operations in which material is fed from the hopper through gate 15 to process equipment 16.

Whenever material is being withdrawn from hopper 11 to the press or other process equipment 16, the two valve plungers 61 and 62 remain in their normally closed condition, illustrated in FIGS. 1 and 3, closing both of the inlet ports 31 and 32. To supply additional material to hopper 11, valve plungers 61 and 62 are operated in alternation to open ports 31 and 32, the timing of movement of the valve plungers serving to control the relative quantities of the two materials supplied to the hopper. Whenever one of the inlet ports 31 and 32 is open, the other is automatically closed, since the two plungers 61 and 62 must move together, being connected for joint movement by the abutment of members 81 and 82, during a supply operation, as shown in FIG. 4. Except for the very brief transitional period in which one of the inlet ports is being closed and the other is being opened, there is no operating condition in which the two ports are open at the same time. Consequently, the possibility of any blowback of material from one supply source to the other is obviated. Furthermore, if there is any failure of the fluid pressure source 96 or of valve sequence control 43, the biasing spring 83 operates both of the valve plungers 61 and 62 to close the two inlet ports 31 and 32. Consequently, there is little or no possibility of transfer of one material to the supply for the other material, preventing contamination of either supply from the other.

In one commercial embodiment of the invention, utilizing a cylinder 53 of 1 ⅛ inches bore with an internal length L of 5⅝ inches and a piston stroke S of 1¾ inches, the spring 83 was selected to afford a total minimum force of about 10 pounds when in the extended condition shown in FIG. 3. The same spring, when compressed, exerted a total force of thirty pounds. A compressed air supply of 50 pounds/square inch gauge afforded an adequately rapid and effective operation for valve mechanism 51.

The engagement of the moderately soft conical surface 70 of valve closure member 69 affords a continuous line seal between the valve closure member and valve seat 34. Any powder or granular material that might tend to accumulate on the conical valve closure member 69 tends to be scraped off of surface 70 as plunger 61 moves to the right in closing inlet port 31. If any granular material is not scraped off, an effective seal can nevertheless be achieved, due to the relatively soft elastomer used in constructing closure member 69. The same operational characteristics apply to closure member 79 and valve seat 38.

Device 10 eliminates any need for external valves in the supply lines 44 and 46. Valve mechanism 51, in hopper 11, affords an accurate and precise proportioning control for device 10. The valve mechanism is capable of long, relatively maintenance-free life and is fail-safe in operation; ports 31 and 32 cannot be held open simultaneously for any substantial period of time and close automatically whenever no positive valve-opening operation is in effect. Furthermore, the complete valve mechanism is relatively simple and inexpensive to manufacture.

We claim:

1. A mixing and storage device for mixing two distinct materials, such as granular plastic materials, in predetermined proportions, and for storing the mixed materials, comprising:

a hopper having two opposed material inlet ports located in the upper portion of the hopper and coaxially aligned with each other;

two valve plungers, each including a closure member, each plunger being axially movable between a closed position in which the closure member closes a respective one of the material inlet ports and an open position in which the closure member is displaced from its associated material inlet port;

biasing means for normally maintaining both of the valve plungers in their closed positions;

fluid pressure actuated cylinder means, mounted in the upper portion of the hopper, for moving the valve plungers between their respective open and closed positions;

and control means for actuating the cylinder means to move the valve plungers in alternation to open and close the material inlet ports alternately in accordance with a predetermined time cycle and thereby introduce two distinct materials into the hopper in predetermined quantities.

2. A mixing and storage device according to claim 1 in which each closure member has a closure surface of tapered configuration formed of moderately soft elastomer material, and in which each material inlet port includes an annular, relatively sharp valve seat facing inwardly of the hopper in position to engage its associated valve closure member in sealing line contact.

3. A mixing and storage device according to claim 2 in which the closure surface of each closure member is of conical configuration.

4. A mixing and storage device according to claim 1 in which the cylinder means comprises:
a cylinder;
two pistons, mounted in opposite ends of the cylinder, each piston being connected to one of the valve plungers;
and fluid pressure means for introducing fluid into the cylinder, under pressure, to drive each piston axially inwardly of the cylinder, against the biasing force exerted by the biasing means, to move the plunger connected to that piston from its closed position to its open position.

5. A mixing and storage device according to claim 4, in which each piston includes a spring retainer projecting axially inwardly of the cylinder toward the spring retainer on the other piston, and in which the biasing means comprises a spring mounted on both spring retainers and urging both pistons outwardly of the cylinder.

6. A mixing and storage device according to claim 5, in which the travel of each piston, in moving its associated valve plunger from closed position to open position, is great enough to bring the two spring retainers into engagement, so that a part of the fluid pressure employed in opening one inlet port serves to increase the sealing pressure at the other inlet port.

7. A mixing and storage device according to claim 1, in which the hopper includes a sealed cover having an air and vacuum port located intermediate the two material inlet ports, and in which material is drawn into the hopper through the inlet ports by exhausting the hopper to develop a substantial vacuum in the hopper.

* * * * *